`US010234256B2`

United States Patent
Lutey

(10) Patent No.: US 10,234,256 B2
(45) Date of Patent: *Mar. 19, 2019

(54) WIRELESS PROGRAMMABLE MEASURING TAPE

(71) Applicant: Diane Lutey, Bellbrook, OH (US)

(72) Inventor: Diane Lutey, Bellbrook, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,922

(22) Filed: Jan. 29, 2018

(65) Prior Publication Data

US 2018/0149456 A1  May 31, 2018

Related U.S. Application Data

(63) Continuation-in-part of application No. 15/246,839, filed on Aug. 25, 2016, now Pat. No. 9,906,639.

(51) Int. Cl.
| | |
|---|---|
| *H04B 1/38* | (2015.01) |
| *G01B 3/10* | (2006.01) |
| *H04R 3/00* | (2006.01) |
| *G06F 3/16* | (2006.01) |
| *H04R 1/02* | (2006.01) |

(52) U.S. Cl.
CPC ............. *G01B 3/10* (2013.01); *G01B 3/1084* (2013.01); *G06F 3/162* (2013.01); *H04R 3/00* (2013.01); *G01B 2210/58* (2013.01); *H04R 1/028* (2013.01); *H04R 2420/07* (2013.01); *H04R 2420/09* (2013.01); *H04R 2499/11* (2013.01)

(58) Field of Classification Search
CPC ... G01B 3/1084; G01B 3/1005; G01B 3/1041
See application file for complete search history.

(56) References Cited

U.S. PATENT DOCUMENTS

| | | |
|---|---|---|
| 2,696,695 A | 12/1954 | Decker |
| 3,040,474 A | 6/1962 | Sirks |
| 4,185,390 A | 1/1980 | Tateishi |
| 4,299,394 A | 11/1981 | Greenspan |
| 4,747,215 A | 5/1988 | Walkas |
| 5,396,578 A | 5/1995 | Howes |
| 6,082,017 A | 7/2000 | Simar |
| 6,520,828 B2 | 2/2003 | Ferrigno |
| 2002/0193964 A1* | 12/2002 | Hsu ...................... G01B 3/1084 702/161 |
| 2007/0056182 A1* | 3/2007 | Di Bitonto ........... G01B 3/1005 33/767 |
| 2008/0034604 A1* | 2/2008 | Critelli ................. G01B 3/1005 33/767 |
| 2012/0046572 A1 | 2/2012 | Odderson |

FOREIGN PATENT DOCUMENTS

| | | |
|---|---|---|
| GB | 175925 | 3/1922 |
| JP | H10227601 A | 8/1998 |

* cited by examiner

*Primary Examiner* — Tuan Pham
(74) *Attorney, Agent, or Firm* — R. William Graham

(57) ABSTRACT

A measuring tape for producing an electrical shock and/or emitting a novelty sound upon actuation of a measuring tape disposed therein.

15 Claims, 3 Drawing Sheets

WIRELESS PROGRAMMABLE MEASURING TAPE

This is a continuation in part of U.S. Ser. No. 15/246,839 filed Aug. 25, 2016 and and claims the priority benefit therefrom.

TECHNICAL FIELD

The present invention relates to measuring tapes. More particularly, the invention relates to a measuring tape with electronic digital storage and playback capabilities for emitting a stimulus.

BACKGROUND

Traditionally, measuring tapes are provided for functionally measuring the length of an object. Measuring tapes exist with means for emitting a unit measure as a function of the final measured length are known. Typically these employ a button which is depressed once the measure is final and then an audio or visual readout occurs. Other tapes emit a noise once the tape portion reaches near the end of the tape to avoid the destruction of the tape itself.

While the above features provide some use advantages over conventional measuring tapes, there is a need to provide a measuring tape with a novel amusement aspect as well as multiple functional aspect. Accordingly, the invention addresses measuring tapes in this regard for improvement thereof.

SUMMARY

It is an object of the invention to improve measuring tapes.

It is an object to enhance novelty features of measuring tapes.

A further object is to provide multiple functionality to conventional measuring tapes.

Still another object of the invention is to provide a novelty shock unit which is operably disposed in a conventional measuring tape.

Accordingly, the present invention is directed to a measuring tape for emitting a novelty stimulus. The tape includes a housing having a incrementally marked tape operably wound therein. A first end of the tape secured at a central area of an inner housing part with a spring or biasing member, and an intermediate portion being wound about itself. A second end extends outside a slot of the housing and includes an angled member to maintain the second end from reentering the housing.

A electronic device, e.g., writable microprocessor and memory chip, is located in the housing and is configured for receiving and/or storing audio data, such as sound segment data, which can for example, mimic a whistle, a fog horn, or be music segment either in stored or streamed format. In addition, there can be provided a stimulus device, such as an electronic current for giving a person a harmless electric shock as a practical joke.

The electronic device is responsive to an activation device, for example a sensor which is responsive to movement of the tape, and for providing the electrical current to the housing (including suitable conductive material as discussed herein) and optionally the received and/or stored audio data to one or more audio speaker which is operably connected to the housing and which is in turn responsive to the activation device.

The activation device can also be programmed to terminate the transmission of the electric current and/or received and stored audio data signal to the audio speaker. The audio speaker(s) are electronically coupled to the writable, electronic device and configured for playing audio data signal received from the writable, electronic device. A power source, such as rechargeable battery, is operably connected to the electronic device located in the measuring tape, and configured for providing power to the electronic device. A charging port can be configured within the housing and operably connected to the electronic device for recharging the battery.

A wireless communication device, such a Blue Tooth, Bluetooth AptX device or AirPlay technology (if a wifi network is available), can be operably connected to the electronic device for receiving an audio data signal electronic data in a streamed format, generally securely electronically coupled to the electronic device, for electronically transmitting data. The electronic storage device can receive audio data wirelessly from a device such as a computer, a CD player, an MP3 player a smart phone and/or the like equipped with a wireless transmitter.

There can also be an audio in port electrically connected to the electronic device for wired transfer of audio data. There can be provided a data electronic cable configured for allowing the source of audio data to download audio data to be received by and stored on the electronic device or streamed to the speaker(s), the audio data electronic cable being further configured for being easily uncoupled from the electronic device on demand of a user.

The power source is preferably a small lithium rechargeable battery while the source of audio data signal may be selected from the group consisting of a computer, a CD player, an MP3 player and a smart phone while the audio data may include one or more files selected from the group consisting of audio, voice, music or sound files. Additionally, there can be a microphone operably connected to the electronic device to permit recording a message or uniquely recorded sound data.

The measuring tape can be configured to play a prerecorded sound or audio message which plays upon pulling the second end measuring tape via software known in the art for designating a particular audio clip, similar to a designated ringtone. The housing can include a switch, for turning on/off the electronic storage device.

Thus the measuring tape has the ability to play audio in a streamed or downloaded format. By so providing, those who work in trades which commonly require use of a measuring tape, can have a tape which also serves a pleasing audio effect. Take for example, framers or builders who continuously use tapes during construction, now the tape serves not only its convention measuring function, but also provides novel audio feature capability and further serves the continuous locating ability by virtue of the sound it emits while in use.

It is important to note that the present invention is not intended to be limited to a the particular orientation of the above described example to satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
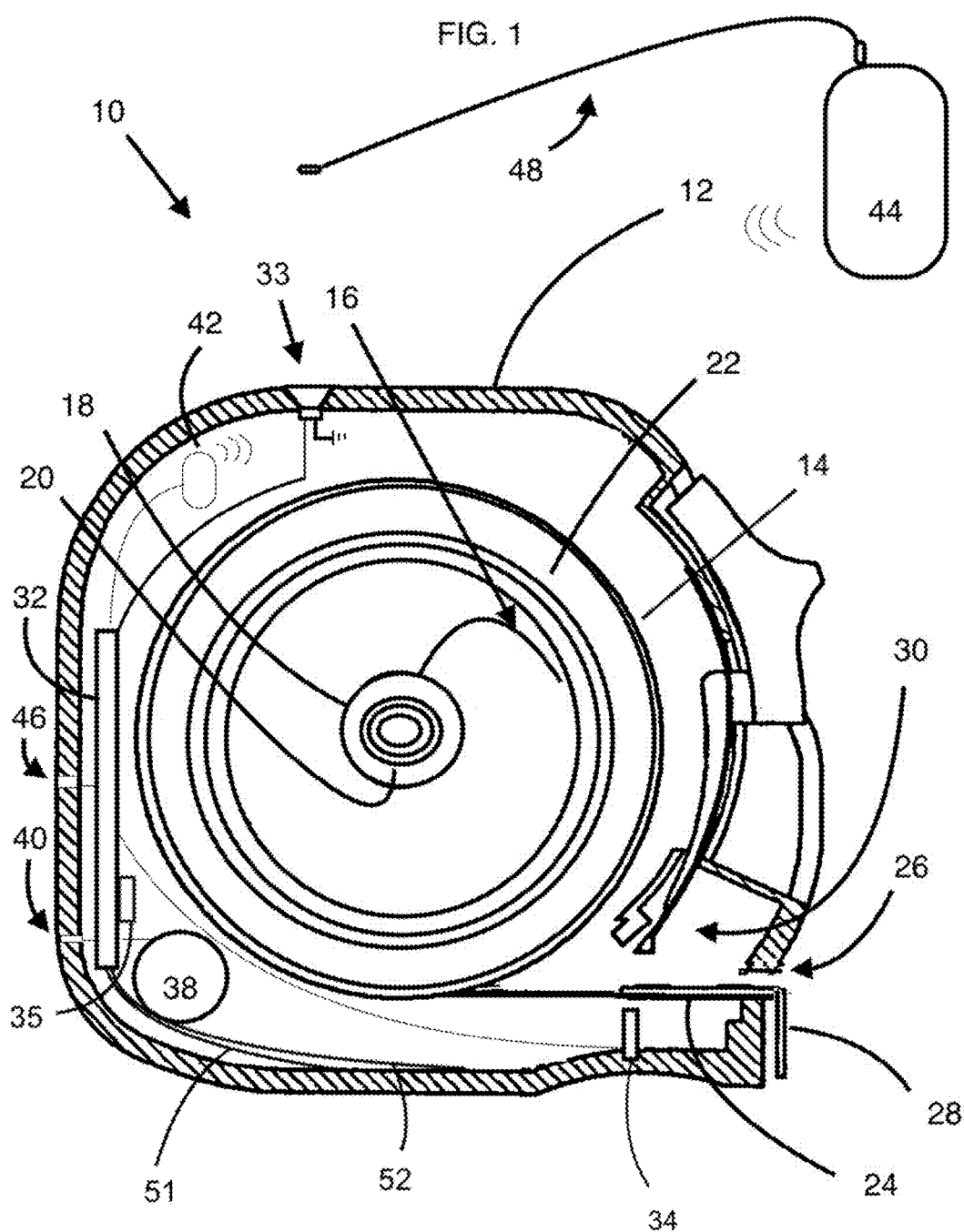
FIG. 1 is a sectional schematic view of a measuring tape in accordance with the present invention in a stored mode.
Figure 2:
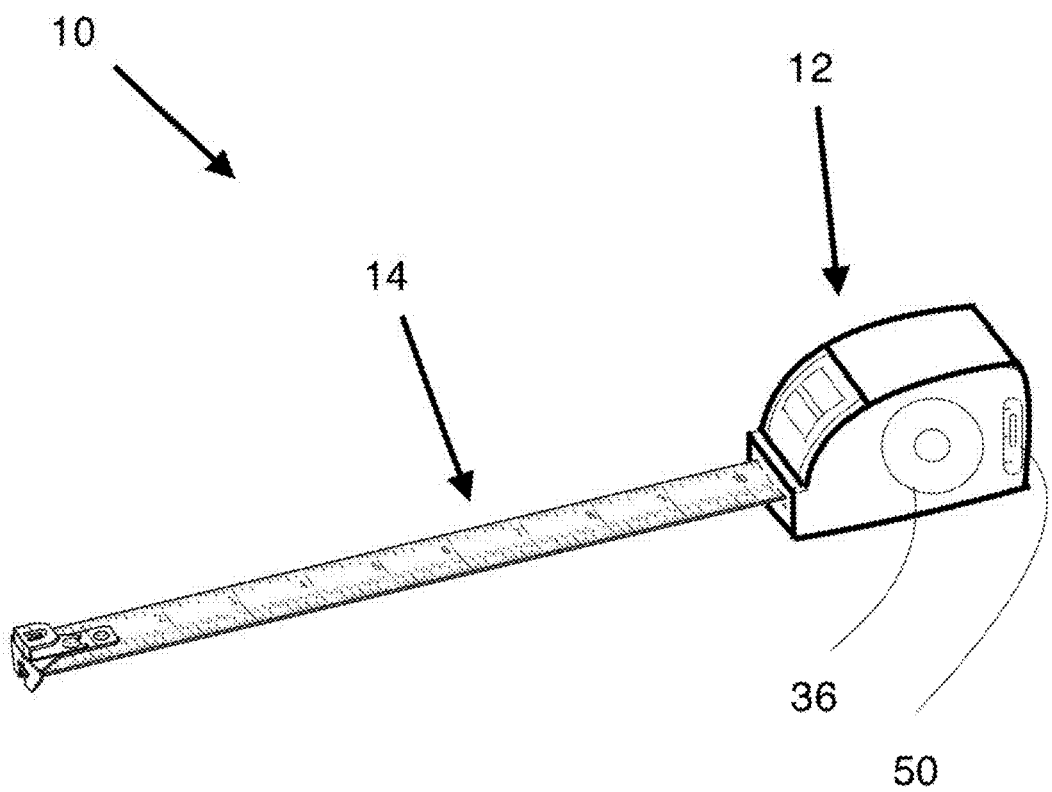
FIG. 2 is a perspective view of a measuring tape in accordance with the present invention in an extended mode.

Referring now to the drawings, the measuring tape of the present invention generally is designated by the numeral 10. The measuring tape 10 can include a housing 12 having a incrementally marked coiled tape 14 operably wound therein. A first end 16 of the tape secured at a central area of an inner housing part 18, such as a bobbin, which is centrally placed in the housing 12 with a spring or biasing means 20 to cause the bobbin 18 to return to its preset orientation upon being forcibly rotated out of its normal resting position. An intermediate portion 22 of the coiled tape 14 being wound about the bobbin 18 and itself. A second end 24 extends outside a slot 26 of the housing 12 and includes an angled member 28 to maintain the second end 24 from reentering the housing 12.

When the tape 14 wound around a bobbin 18 set in the housing 12 is pulled out through the slot 26 formed on the lower portion of the housing 12, a stopper or locking member 30 as is known in the art can be employed to locked the tape 14 in position by a frictional force.

Figure 3:
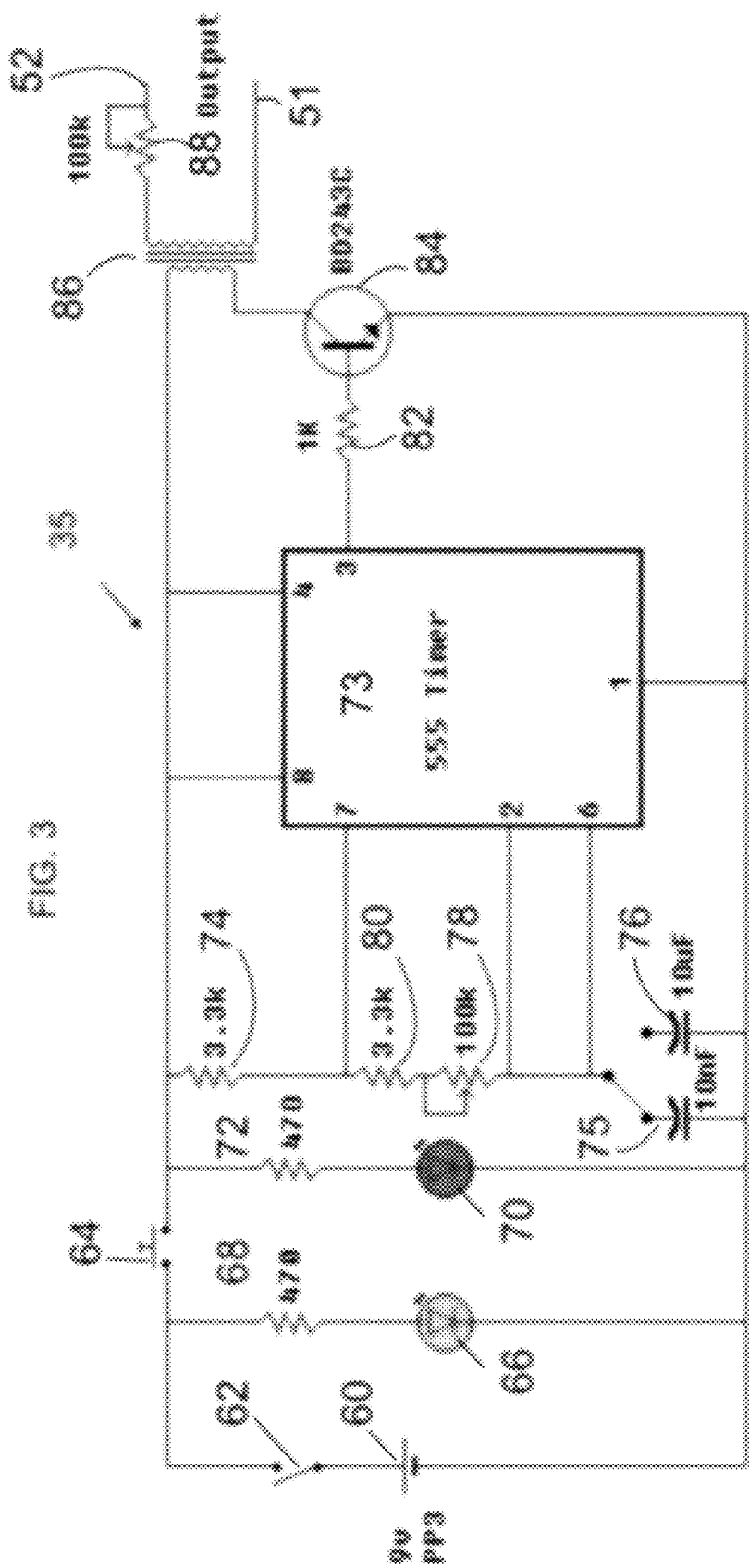
FIG. 3 is an exemplary electrical schematic for part of the invention.

A electronic device 32, e.g., writable microprocessor and memory chip, is located in the housing 12 and in one aspect is configured for receiving and/or storing audio data, such as a sound segment data, which can for example, mimic a whistle, a fog horn, or be music segment either in stored or streamed format. The electronic device 32 can also include another electric stimulus component 35 as represented in FIG. 3 employing an electric shock circuit with conductive lines 51 and 52 disposed and arranged in relation to each other and within the housing 12 and relative to tape 14 and are secured thereto in any suitable manner. It is contemplated that the shocking component can be an inductive coil or a transformer or circuit chip operably disposed in the housing 12 and that the one shown is exemplary only.

Referring now in particular to FIG. 3, a schematic diagram representation of a high-voltage, low-current novelty electric "shock" effect circuit of the present invention is illustrated and referred to by the numeral 35. The electric "shock" effect circuit 35 depicts an alternative aspect of the present invention wherein the novelty "shock" is produced with a continuous train of pulses as opposed to a single pulse each time the novelty device is activated. Novelty electric "shock" effect circuit 35 generally comprises a battery 60, power switch 62, optional LED power indicator 66, activation switch 64, optional LED activation indicator 70, astable multivabrator integrated circuit (IC) 73, timing components 74, 75, 76, 78 and 80, output transistor 84, voltage step-up transformer 86 and output leads 51 and 52. Battery 60 can be one of many types which are well known and commercially available such as a 9-volt type PP3 lithium battery. Astable multivabrator IC 73 is preferably a type 555 which is well known to anyone of ordinary skill in the art and commercially available under such trademarks as Signetics®, Maxim® and STMicroelectronics®. Output transistor 84 is preferably an NPN high-gain bi-junction transistor and can one of a myriad of general-purpose devices well known to anyone of ordinary skill in the art such as the BD243C or 2N2222A. Alternatively, a MOSFET-type device may be substituted for output transistor 84. Voltage step-up transformer 86 can be an ordinary audio-output type transformer with the primary-to-secondary turns ratio selected to provide the desired gain in voltage. For the present invention, a turns ratio in the range of 8:1 to 15:1 is preferred.

Novelty electric "shock" effect circuit 35 operates as follows: When power switch 62 is closed, turning the device on, power from battery 60 is provided to activation switch 64 and resistor 68. An optional power indicator LED 66 completes the circuit to the battery with resistor 68 limiting the current flow through LED 66 causing it to light. When activation switch 64 is closed, battery power is subsequently provided to resistor 72, astable multivibrator IC 73 and a first primary leg of step-up transformer 86. Optional activation LED 70 completes the circuit to the battery with resistor 72 limiting the current flow through LED 70 whereupon LED 70 also lights. Astable multivibrator IC 73 produces a continuous train of output pulses at pin 3 the duration and timing of said pulses being determined by resistor 74, resistors 78 and 80, and capacitors 75 and 76. These components work together to control the characteristics of the pulse to produce an optimized "shock" effect for the novelty device. The components can be selected and fixed at the time of manufacture, such as resistor 74; components can be user selectable such as capacitors 75 and 76; or, components can be variable such as resistor 78 that permits fine adjustment of the output pulse characteristics either at the time of manufacture or by the user when deploying the present invention. The output pulse train from astable multivibrator IC 73 alternates between a high (ON) state and low (OFF) state and subsequently drives the base of output transistor 84 through current limiting resistor 82. The value of current limiting resistor 82 is selected to provide sufficient current through the base-emitter junction of transistor 84 to enable switching the transistor ON when the output pulse is high and thus completing the circuit between the battery and a second primary leg of step-up transformer 86. When transistor 84 is switched ON in this manner, the primary coil of step-up transformer 86 generates a magnetic field within its ferrous core storing energy from the battery in said magnetic field. When output transistor 84 is subsequently switched OFF by astable multivibrator IC 73, said magnetic field collapses and through mutual induction, transfers said stored energy to the secondary coil of output transformer 86 whereupon an electromotive force (EMF) is developed causing the output voltage of the secondary coil of step-up transformer 86 to be increased to a level that can provide a robust but harmless electric "shock" effect. This increase in voltage, and resultant decrease in current in step-up transformer 86 is a product of the turns-ratio between the primary and secondary windings of step-up transformer 86.

In order for circuit 35 to deliver the electric "shock" effect to a human as part of a "prank", the secondary coil of step-up transformer 86 must complete a circuit, and thus pass current through, a human body part which preferably is a hand. In order to impart said current, leads 51 and 52 are provided in conjunction with two insulated conductive surfaces (not shown) arrayed along the sides, top and bottom of the housing of the present invention. These said conductive surfaces can be made from myriad conductive materials, well known to anyone of ordinary skill in the art, including various metals, metallic foils, conductive colloids/gels/paint, carbon composites, etc. These said conductive surfaces can be bonded to the housing of the present invention using glues, epoxies, pressure-sensitive adhesives and the like. In any case, the function of the conductive surfaces is to ensure the circuit of the secondary coil of step-up transformer 86 is completed in such a way as to deliver an optimized "shock" effect. The aforementioned surfaces should have large surface areas and be so arranged as to promote an effective electrical contact with the body part and more preferably the hand. By way of example, one configuration may include two insulated self-adhering conductive foil surfaces attached to the housing of the present invention; a first surface adhered to the top and left side of the housing and a second surface adhered to the bottom and right side of the housing. Utilizing this approach, regardless of how the novelty device is held in the hand, i.e., side to side, or top to bottom, the secondary circuit will be completed and current will flow through said body part, preferably the hand.

Output leads 51 and 52 connect to the aforedescribed first and second conductive surfaces which are insulated from each other to prevent contact and the creation of a "short" circuit that would inhibit the delivery of the "shock" effect. These leads can be connected to said conductive surfaces in myriad ways including the use of conductive epoxy or mechanical connection such as soldering, for example. In addition, an optional resistive element 88 can be placed in series with either output lead 51 or 52 to limit the current that is permitted to flow in the secondary output circuit of step-up transformer 86. This optional resistor 88 can be of a fixed or adjustable value.

Additionally, there can be a microphone 33 operably connected to the electronic device 32 to permit recording and storing a message or uniquely recorded sound data. The electronic device 32 is responsive to an activation device 34, which can be sensor, which is responsive to movement of the tape 14, for example, providing the initiation of received and/or stored audio data to one or more audio speaker 36 operably connected to the housing 12 and which is responsive to the activation device 34. In one embodiment, the return of the tape 14 to its normally stored position as seen in FIG. 1, closes or terminates transmission of the received and stored or audio data to the audio speaker.

The audio speaker(s) 36 are electronically coupled to the electronic device 32 and configured for playing audio data received from the electronic device is provided. A power source 38, such as rechargeable battery, is operably connected to the electronic storage device 32 located in the measuring tape housing 12 and configured for providing power to the electronic device 32. A charging port 40, such as a USB port, can preferably be configured within the housing 12 and operably connected to the electronic device 32 for supplying power and/or recharging the battery 38. This provides for AC or DC power sources to be used.

A wireless communication device 42, such a Blue Tooth, Bluetooth AptX device or AirPlay technology (if a wifi network is available), can preferably be operably connected to the electronic storage device 32 for receiving an audio data electronic data in a wireless (streamed) format, generally securely electronically coupled to the electronic device 32, for electronically transmitting data. The electronic device 32 can receive audio data wirelessly from a device 44 such as a computer, a CD player, an MP3 player a smart phone and/or the like equipped with a wireless transmitter.

There can also be an audio in port 46 electrically connected to the electronic device 32 for wired transfer of audio data. There can be provided a data electronic cable 48 configured for allowing the source of audio data to download audio data to be received by and stored on the electronic device 32 or streamed to the speaker(s) 36, the audio data electronic cable being further configured for being easily uncoupled from the electronic device 32 on demand of a user.

The power source 38 can preferably be a battery, such as a small lithium rechargeable battery, while the source of audio data may be selected from the group consisting of a computer, a CD player, an MP3 player and a smart phone while the audio data may include one or more files selected from the group consisting of audio, voice, music or sound files.

The measuring tape 10 can be configured to deliver an electrical stimulus or shock and/or play a prerecorded sound or audio message which plays via software known in the art for designating a particular audio clip, similar to a designated ringtone, upon pulling the second end 24 of measuring tape 10. The housing 12 can include a switch 50, (e.g. slide switch) for turning on/off the electronic device 32 and/or choosing between wireless and wired communication. It will therefore be seen that there has been provided a novel tape which will produce an electric shock to be used in jokes and novelty situations, and the mechanism may be incorporated in the housing 12 and as soon as the tape 14 is moved slightly the person will receive a harmless electric shock.

The electronic device 32 also called a recordable chip is coupled to an activation device 34, which can be sensor or sliding lever which is triggered by movement of the tape 14, for example, providing the initiation of received and/or stored audio data to one or more audio speaker 36 operably connected to the housing 12 and which is responsive to the activation device 34. As an example, there device 34 can include a pressure sensitive element, optical element or any other device that can detect some activation or movement of the measuring tape 14 to signal that the audio data recorded on the electronic device 32 should begin to play, and which subsequent movement, a predetermined period of time or the de-activation of the activation device 34 can also signal when the electronic device 32 should stop playing the audio data.

In accordance with the present invention, the electronic device 32 can be, in one embodiment, connected either directly via wireless device 42 or indirectly to via cable 48 via audio in port 46 which allows the electronic device 32 to be connected to electronic device 44 such as a computer, CD player, MP3 player, Smart phone or other similar processing device. The cable 48 is preferably supplied with the measuring tape 10. As mentioned, the electronic device 32 may be provided as part of a circuit, that is equipped with a wireless receiver device 42, as described above, such as a blue tooth receiver or the like, to enable electronic device 44 to transmit user recorded or assembled audio data signal wirelessly to the electronic device 32 for streamed or later playback, as described herein.

The electronic device 32 permits a user to select one or more prerecorded music, voice or sound files which the user himself or herself has recorded or which the user has downloaded and stored on the electronic device 44. The user may select a single file or the user may combine together multiple files.

In this configuration, the electronic device 32 functions with the electronic device 44 as a plug-and-play storage device that allows a user to select a file or files of proper size which will fit on the electronic device 32 and transfer them from the electronic device 44 to the electronic device 32 using the supplied cable 48 or wireless device 42. The cable 48 may be a reusable cable such as a USB, firewire, serial or other currently accepted standard connectable data communication cable. The cable 48 may include a standard type connector presently available or of a standard which is not yet available or developed. Any connector provided should have a profile that fits within a suitable input port 46 the housing 12.

In this manner and utilizing the system and method of the present invention, a user may create or select one or more voice files, music files, or audio files from the electronic device 44; download the file(s) to the electronic device 32 using a cable 48 or wireless device 42; and subsequently disengage the download cable 48, resulting in a traditional functioning measuring tape 10 with the added benefit of a customized, audio message or streamed audio that plays when the measuring tape 10 opens or when the switch 50 is moved from an off position to a shock on position, an audio on position (wireless or wired mode), wherein the switch 50 can include multiple operably positions.

The measuring tape 10 has the ability to play audio in a streamed or downloaded format. By so providing, those who work in trades which commonly require use of a measuring tape, can have a tape which also serves a pleasing audio effect. Take for example, framers or builders who continuously use tapes during construction, now the tape serves not only its convention measuring function, but also provides novel prank shock, and/or audio feature capability and further serves the continuous locating ability by virtue of the sound it emits while in use.

The present invention is not intended to be limited to a device to satisfy one or more of any stated or implied objects or features of the invention and should not be limited to the preferred, exemplary, or primary embodiment(s) described herein. Modifications and substitutions by one ordinary skill in the art are considered to be within the scope of the present invention which is not to be limited except by the allowed claims and their legal equivalents.

What is claimed is:

1. A measuring tape, which includes:
   a housing having a incrementally marked tape operably wound therein, a first end of said tape secured to an inner housing part with biasing member, an intermediate portion being wound about itself, and a second end extending outside a slot in said housing and includes an angled member to maintain said second end from reentering said housing;
   an electronic device operably disposed in said housing and configured for providing an electrical current to said housing in a manner to cause an electric stimulus;
   a power source operably connected to said electronic device; and
   an activation device disposed within said housing including a sensor which is responsive to movement of said tape causing said electronic device to transmit said electrical current to produce an electrical shock current.

2. The measuring tape of claim 1, which includes a speaker operably disposed on said housing; said electronic device further configured for receiving and/or storing an audio data signal, said electronic device for providing said received and/or stored audio data signal to said audio speaker operably connected to said housing and which is responsive to movement of said tape causing audible emission of said audio data signal through said speaker.

3. The measuring tape of claim 2, which includes a wireless communication device operably connected to said electronic device for receiving said audio data signal.

4. The measuring tape of claim 1, said power source includes one of a direct current and alternating current power source.

5. The measuring tape of claim 4, wherein said power source is a rechargeable battery and further including a charging port operably disposed within said housing and operably connected to said electronic device for recharging said battery.

6. The measuring tape of claim 3, wherein said wireless communication device includes one of Blue Tooth device, Bluetooth AptX device and AirPlay device.

7. The measuring tape of claim 2, which further includes a removable data electronic cable configured for allowing a source of audio data to download audio data to be received by and/or stored on said electronic device.

8. The measuring tape of claim 2, which further includes a microphone operably connected to said electronic device to permit recoding and storage of sound data.

9. A measuring tape, which includes:
   a housing having an incrementally marked tape operably wound therein, a first end of said tape secured to an inner housing part with biasing member, an intermediate portion being wound about itself, and a second end extending outside a slot in said housing and includes an angled member to maintain said second end from reentering said housing;
   an activation device responsive to movement of said tape;
   a speaker operably disposed on said housing;
   an electronic device operably disposed in said housing and configured for at least one of providing an electrical current to said housing in a manner to cause an electric stimulus and for receiving and/or storing an audio data signal, said electronic device is responsive to said activation device and operably connected thereto such that said electronic device provides at least one of causing said electronic device to transmit said electrical current to one of said said housing producing an electrical shock current and causing transmission of said received and/or stored audio data signal to said audio speaker; and
   a power source operably connected to said electronic device and said speaker.

10. The measuring tape of claim 9, said power source includes one of a direct current and alternating current power source.

11. The measuring tape of claim 9, wherein said power source is a rechargeable battery and further including a charging port operably disposed within said housing and operably connected to said electronic device for recharging said battery.

12. The measuring tape of claim 9, which further includes a wireless communication device operably connected to said electronic device for receiving said audio data signal.

13. The measuring tape of claim 9, wherein said actuation device includes a sensor which is responsive to movement of said tape.

14. The measuring tape of claim 9, which further includes a removable data electronic cable configured for allowing a source of audio data to download audio data to be received by and/or stored on said electronic device.

15. The measuring tape of claim 9, which further includes a microphone operably connected to said electronic device to permit recoding and storage of sound data.

* * * * *